US005422793A

United States Patent [19]

Kobayashi

[11] Patent Number: 5,422,793

[45] Date of Patent: Jun. 6, 1995

[54] PROJECTION-TYPE HEADLIGHT HAVING REDUCED COLOR FRINGES

[75] Inventor: Shoji Kobayashi, Shizuoka, Japan

[73] Assignee: Koito Manufacturing Co., Ltd., Tokyo, Japan

[21] Appl. No.: 104,589

[22] Filed: Aug. 11, 1993

[30] Foreign Application Priority Data

Sep. 1, 1992 [JP] Japan .................................. 4-255455

[51] Int. Cl.$^{6}$ ............................................... B60Q 1/00

[52] U.S. Cl. ....................................... 362/61; 362/308; 362/328; 362/331; 362/268

[58] Field of Search ................... 362/61, 80, 307, 308, 362/328, 331, 329, 268

[56] References Cited

U.S. PATENT DOCUMENTS 3,578,966 5/1971 Levin .
3,708,221 1/1973 Schaefer .
4,100,594 7/1978 Gould .
4,517,630 5/1985 Dieffenbach et al. .......... 362/328 X
4,562,519 12/1985 Deves .................................. 362/308
4,771,372 9/1988 Litetar et al. ....................... 362/307
5,021,930 6/1991 Yamada ................................ 362/61
5,036,438 7/1991 Nakata .

FOREIGN PATENT DOCUMENTS 3430179 3/1985 Germany .
0186701 7/1989 Japan .................................... 362/61

*Primary Examiner*—Ira S. Lazarus
*Assistant Examiner*—Thomas M. Sember
*Attorney, Agent, or Firm*—Sughrue, Mion, Zinn, Macpeak & Seas

[57] ABSTRACT

A projection-type headlight in which changes in the focal length of the projection lens cause color fringes arising due to chromatic aberration to be less noticeable in the luminous intensity distribution pattern, while a good horizontal spread is obtained in the luminous intensity distribution pattern. The projection lens is designed so that its focus lies at the front end of the top edge of a shield plate in a region within a predetermined distance from the optical axis as seen from the front, whereas the back focal length increases with decreasing distance to the margin of the lens in a region outside the first region. The projection lens is also designed in such a way that the amount of change in the back focal length of a sectional lens portion in region as cut through a vertical plane including the optical axis is smaller than the amount of change in the back focal length of a sectional lens portion in region as cut through a horizontal plane including the optical axis.

8 Claims, 12 Drawing Sheets

PROJECTION-TYPE HEADLIGHT HAVING REDUCED COLOR FRINGES

BACKGROUND OF THE INVENTION

The present invention relates to a headlight of a projection type in which color fringes caused by chromatic aberration in a projection lens are suppressed, and the lens is prevented from producing a diffuse luminous intensity distribution in the horizontal direction.

A headlight currently in use is of a projection type that utilizes the same imaging principle as a projector. Such headlights have gained wide acceptance because they are small in size and yet provide good luminous intensity distribution characteristics and a broad uniform distribution of hot zones.

FIG. 18 shows schematically the composition of a projector-type headlight.

The projector-type headlight a has such a construction that beams of light issued from a light source b and which have been reflected by an elliptic reflector c are gathered at a position near the top edge of a shield plate d, which is slightly offset from the reflector c in either a forward or a backward direction, whereby a predetermined amount of light is cut off. Thereafter, the inverted image of the shield plate d is projected far forward by means of a projection lens e positioned ahead of the shield plate d. Because of this construction, the headlight a forms a cut line (cutoff line) characteristic of a low beam. The line L-L indicated by a one-long-and-one-short dashed line signifies the optical axis.

The projection lens e has a flat surface on the side closer to the light source. The other side from which light emerges is typically aspheric, with the focus being near the top edge of the shield plate d.

FIG. 19 shows the shape of the projection lens e as seen from the front. The projection lens e has rotational symmetry with respect to the optical axis L-L (normal to the plane of the paper) that passes through the intersection O of a horizontal axis RH-LH and a vertical axis UV-DV, and which extends in forward and backward directions at right angles with respect to those axes.

One of the problems known to occur in the above-described projector-type headlight is that, on account of the chromatic aberration in the projection lens e, light departing from the paraxial region is separated into spectra to produce an iridescent pattern near the cut line, thereby causing lower visibility. This phenomenon occurs for the following reason.

As shown in FIG. 18, light entering the marginal portion of the projection lens e is separated into spectra on account of the chromatic aberration in the lens. That is, the blue light $l_b$ is refracted more strongly towards the optical axis than the red light $l_r$. As a result, color fringes will form in the vicinity of the cut line. In certain cases such as when the vehicle pitches (when its front end rises or falls), the headlight may produce color shades that occasionally can be confused with a signal light or a marker light, thus resulting in a safety hazard. In addition, the headlight can experience a color change to red or blue depending on the viewing angle, which causes a problem such as discomfort or dazzling to the driver of an oncoming vehicle or a pedestrian.

As shown by hatched areas in FIG. 19, the blue chromatic aberration is noticeable in region g closer to the lower edge of the lens, whereas the red chromatic aberration is noticeable in region f closer to the upper edge of the lens. It has been found though that the blue chromatic aberration produces a particularly great sense of "strangeness". Therefore, a need exists for improving the shape of the lower part of the lens.

A further problem is that in the case where the reflector of the projector-type headlight has rotational symmetry with respect to the optical axis, the lens is unable to produce adequate beam spread in the horizontal direction. To cope with this problem, there is a need to construct the reflector with a compound surface or the like, but this involves certain difficulties in the making of a suitable mold, and is cumbersome in the accompanying need to take into account the effect of molding precision on the performance of luminous intensity distribution.

SUMMARY OF THE INVENTION

To solve the aforementioned problems, the present invention provides a projection-type headlight that has a light source located at a first focal position of a reflector so as to cause reflected light to be collected at a second focal position of the reflector, that limits a cut line by means of a shield plate located in such a way that its top edge lies near the second focal position and which is shaped so that a patterned image is thereafter projected through a projection lens lying forward thereof, which projection-type headlight is characterized in that foci of a section of the exit surface and/or the entrance surface of the projection lens as cut through a horizontal or a vertical plane lie on the optical axis, that foci defined for the range of the exit surface and/or the entrance surface within a predetermined distance from the optical axis in both horizontal and vertical directions or for a predetermined range of a section of the exit surface and/or the entrance surface as cut through a vertical plane including the optical axis lie near the top edge of the shield plate, and that compared to the back focal length in the range specified above, the back focal length in the remaining range is made longer and increases progressively with decreasing distance to the margin of the lens.

According to the present invention, the back focal length is designed to increase progressively with the decreasing distance of the lens, except in the portion where beams of outgoing light parallel to the optical axis are produced, so that the closer the point of incidence of light is to the margin of the lens, the farther away is the light controlled to emerge. As a result, the effect of blue or red light on the pattern of luminous intensity distribution is reduced and, in particular, the blue light that would otherwise remain above the cut line is less noticeable.

In addition, the closer the point of incidence of light is to the margin of the lines in the horizontal direction, the farther away is the light controlled to emerge; hence, it is possible to produce a pattern of luminous intensity distribution that is adequately spread in the horizontal direction.

DESCRIPTION OF THE PREFERRED EMBODIMENTS

The projection-type headlight of the present invention will be described below with reference to preferred embodiments shown in the accompanying drawings.

FIGS. 1–7 show a first embodiment of the present invention.

Figure 4:
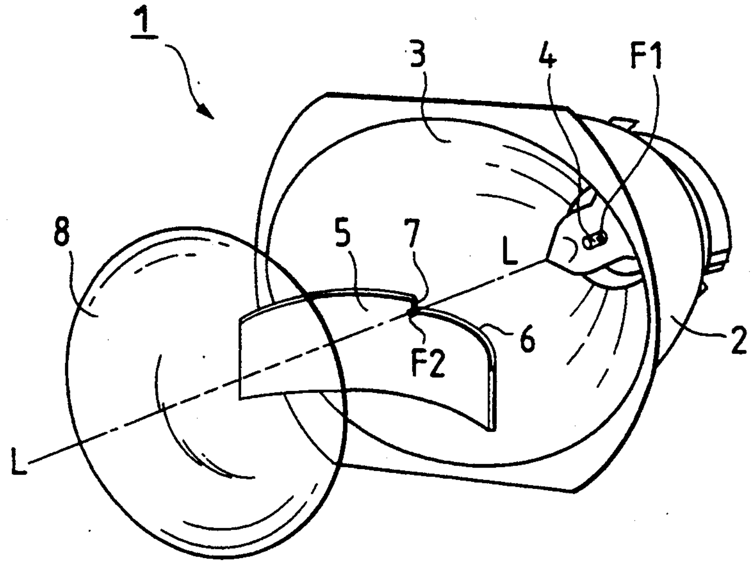
FIG. 4 is a perspective view showing diagrammatically an exemplary composition of a projection-type headlight.

As shown in FIG. 4, the projection-type headlight, generally indicated by reference numeral 1, includes a shield plate positioned forward of a reflector, with a projection lens in turn being positioned forward of the shield plate.

Shown by 2 in FIG. 4 is an elliptic reflector that has a reflecting surface 3 of a shape generally defined by axially truncating in half a spheroidal member around the optical axis L-L. Hence, the reflecting surface 3 has an inner, first focus $F_1$ and an outer, second focus $F_2$.

A coiled filament 4 (FIG. 4) is positioned in such a way that its central axis extends along the optical axis L-L of the reflecting surface 3, whereas the point generally at the center of the filament 4 coincides with the first focus $F_1$ of the reflecting surface 3. Therefore, beams of light emerging from the filament 4 are reflected by the reflecting surface 3 to be collected at the second focus $F_2$, and thence diverge in a forward direction.

A shield plate 5 is concave toward the front. The shield plate is positioned in such a way that it traverses the optical axis L-L of the reflecting surface 3, and the edge of its top end 6 is at such a height that it is close to a horizontal plane including the optical axis L-L. The shield plate 5 has a shape such that when the edge of its top end 6 is bisected by a vertical plane including the optical axis L-L, the height of the top edge on one side is slightly lower than that of the top edge on the other side, with a slope 7 being formed near the optical axis L-L where the two sides join.

The second focus $F_2$ of the reflecting surface 3 is positioned near the front end of the edge of the top end 6 of the shield plate, namely, on the optical axis L-L at a position slightly offset in a forward direction from a point just above the middle of the top end 6.

A projection lens 8 is positioned forward of the shield plate 5. The projection lens 8 is a convexoplanar lens having a flat surface on the side facing the shield plate 5 (in other words, the lens surface on the entrance side is flat and the lens surface on the exit side is convex).

Figure 1:
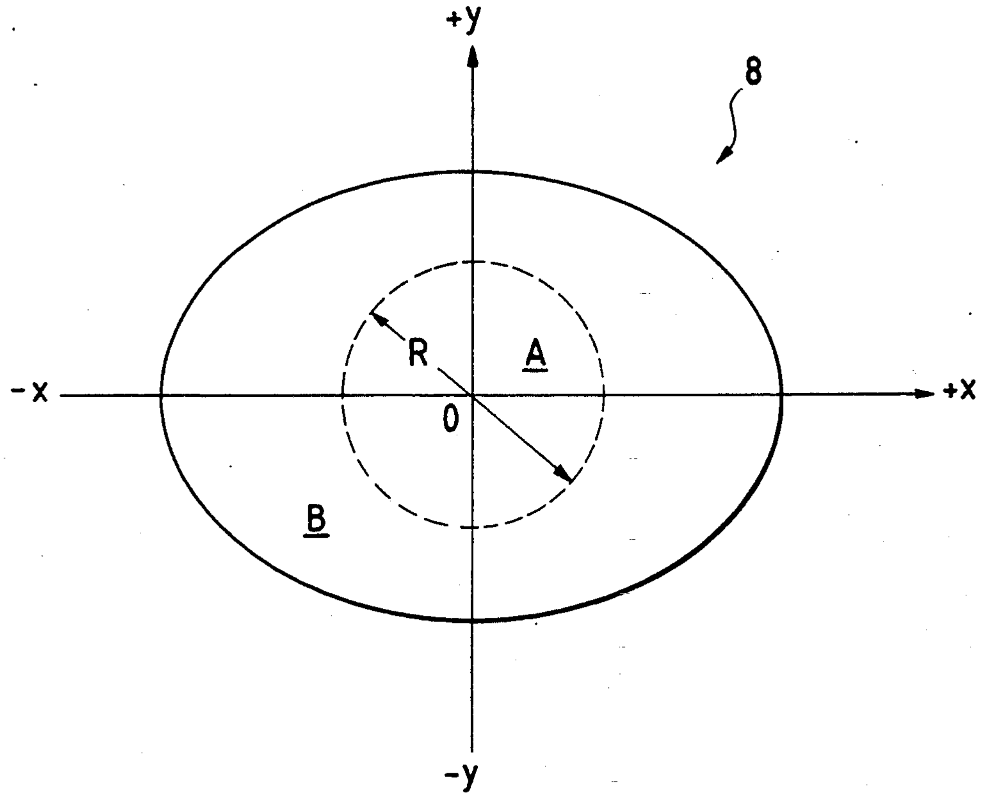
FIG. 1 is a front view of a projection lens constructed according to the first embodiment of the present invention.

FIG. 1 is a front view of the projection lens 8 relative to a rectangular coordinate system having three axes, the z-axis being coincident with the optical axis L-L (in FIG. 1, the z-axis is perpendicular to the plane of the paper and the direction toward the light source is taken as "positive"), the x-axis that crosses the z-axis at right angles and which extends horizontally (the direction toward the right is taken as "positive"), and the y-axis that crosses the x-axis at right angles and which extends vertically (the upward direction is taken as "positive"), with the origin of these crossed axes coinciding with the vertex O of the projection lens 8.

The external appearance of the projection lens 8 is a generally elliptic shape that is asymmetric with respect to the horizontal line and which is defined so that the lens has different focal positions in a region A within a circle having a radius R with the center at the vertex O (as indicated by a dashed line in FIG. 1) and a region B which is outside said circle.

Stated more specifically, the shape of the projection lens 8 is defined so that the focal position with respect to the region B is to the rear (the closer to the light source) compared to the focal position with respect to the region A.

It should be noted here that there is no step at the boundary between the two regions A and B, and the exit surface of the projection lens 8 is formed as a smooth continuous curved surface.

Figure 2B:
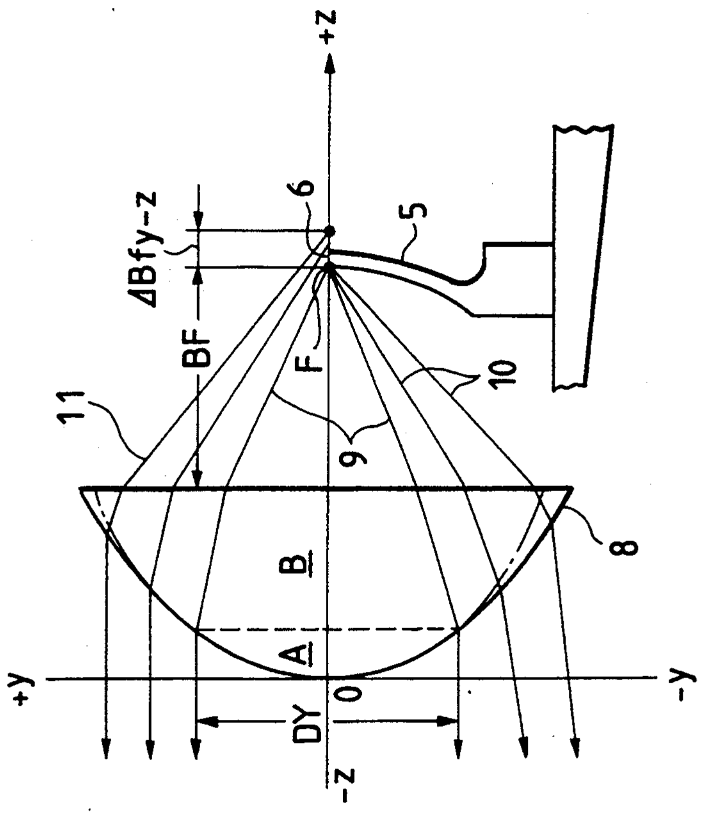
FIG. 2(*a*) is a front view and FIG. 2(*b*) is a ray tracing diagram for illustrating the focal length of the projection lens according to the first embodiment.
Figure 2A:
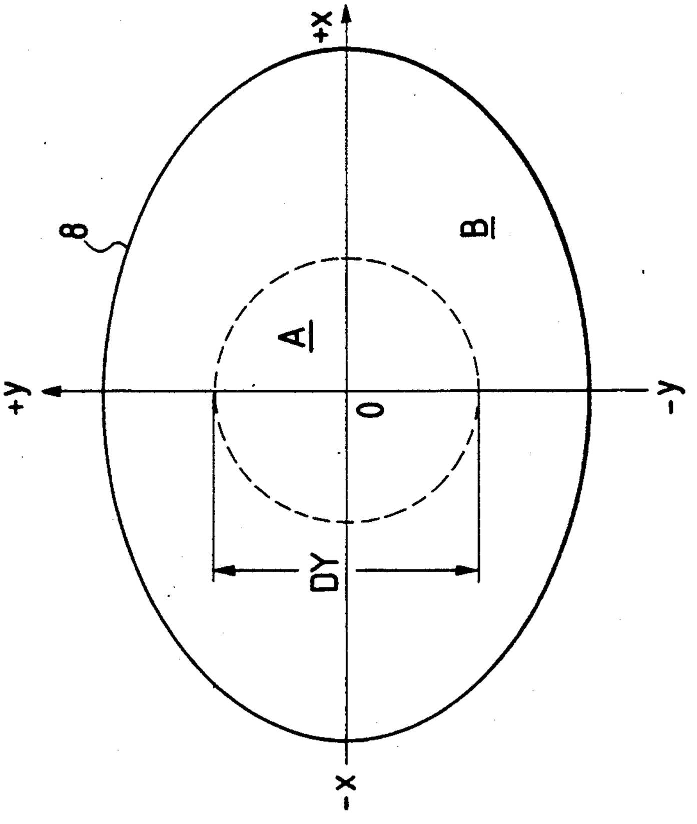

FIG. 2(*b*) is a ray tracing diagram for a section of the front portion of the projection-type headlight 1 as cut through the y-z plane. In this diagram, the region centered at the vertex O and covered by distance DY (i.e., $|y| \leq DY$) defines the region A, and the surrounding region defines the region B.

In the lens portion of region-A that includes the paraxial region, the focus F (the backward focal length is denoted by "BF") is set on the optical axis at the front end of the top edge of the shield plate, as shown by rays of light 9.

In the lens portion of region B, the focal position is shifted from point F progressively rearward with increasing distance along the y-axis from the vertex O in the region of the lower side ($y<0$).

It should be mentioned that this tendency is also observed on the upper side of the lens in connection with the lens portion of region B.

Stated more specifically, in the region of the upper side ($y>0$), the focal position is set at a point on the optical axis offset rearward by a certain amount $\Delta Bf_{y-z}$, as shown by rays of light 11.

This amount of change $\Delta Bf_{y-z}$ is not a fixed value but increases with decreasing distance to the margin of the projection lens 8.

It should be noted that the maximum value for the amount of change in the rear focal position need not be equal on the upper and lower sides of the lens portion in region B as divided the x-z plane. In fact, in order to reduce the blue chromatic aberration that develops in the lower edge portion of the lens, the maximum value for the amount of change that occurs on the lower side is desirably adjusted to be greater than in the case for the upper side.

Figure 3B:
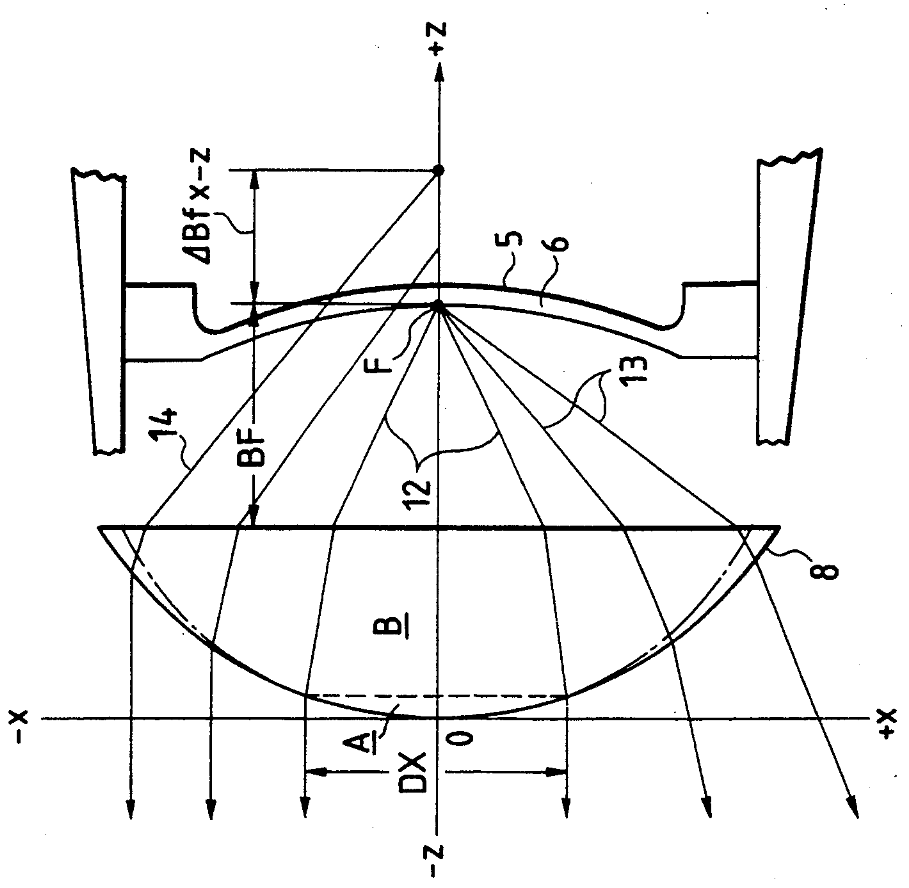
FIG. 3(*a*) is a front view and FIG. 3(*b*) is a ray tracing diagram for illustrating the focal length of the projection lens according to the first embodiment showing a different section than FIGS. 2(*a*) and 2(*b*)
Figure 3A:
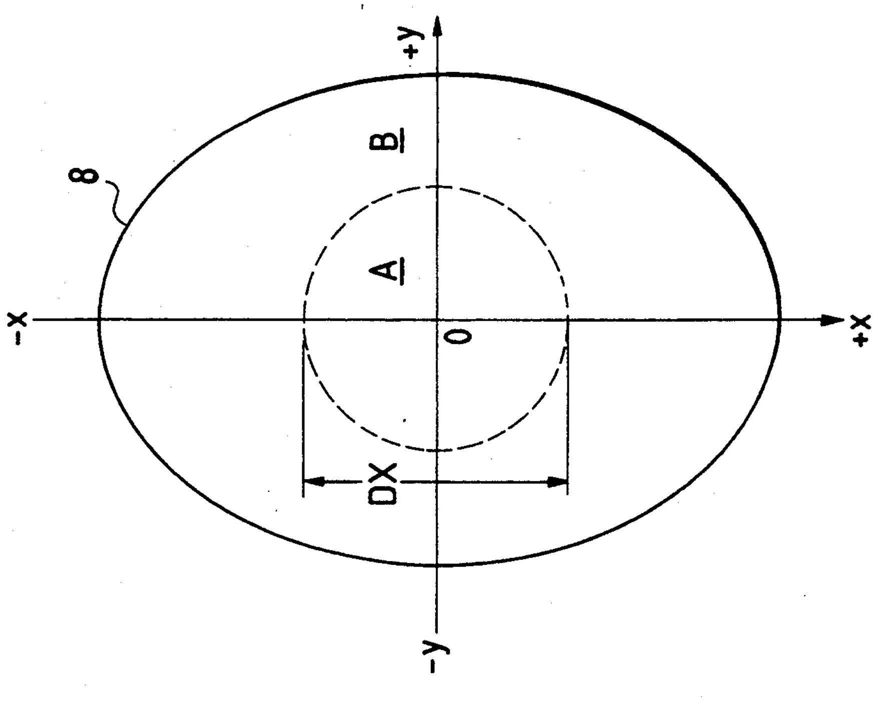

FIG. 3 is a ray tracing diagram for a section of the front portion of the projection-type headlight 1 as cut through the x-z plane. In the diagram, the region centered at the vertex O and covered by distance DX (i.e., $|x| \leq DX$) defines the region A, and the surrounding region defines the region B.

As shown, the lens portion in region A is such that the focus F is set on the optical axis at the front end of the top edge of the shield plate 5, as is clear from rays of light 12.

In the lens portion of region B, the focal position shifts from point F progressively rearward with increasing distance from the vertex O in the region on the right side ($x>0$), as shown by rays of light 13.

There is the same tendency in the region on the left side ($x<0$), and its focal position is set on the optical axis at a point offset rearward by a certain amount of $\Delta Bf_{x-z}$, as shown by rays of light 14.

It should be noted that this amount of change $\Delta Bf_{x-z}$ is not a fixed value, but tends to increase with decreasing distance to the margin of the projection lens 8. In addition, it is so defined with respect to the aforementioned value $\Delta Bf_{y-z}$ as to satisfy the relation $\Delta Bf_{x-z} > \Delta Bf_{y-z}$.

As discussed above, the lens design for the present invention is such that the focal position is selected to lie at a constant focus F within the region A, but in the outer region B, the focus is always positioned rearward of point F and, at the same time, the amount of change in back focal length will increase progressively with the increasing distance from the vertex O.

Figure 6A:
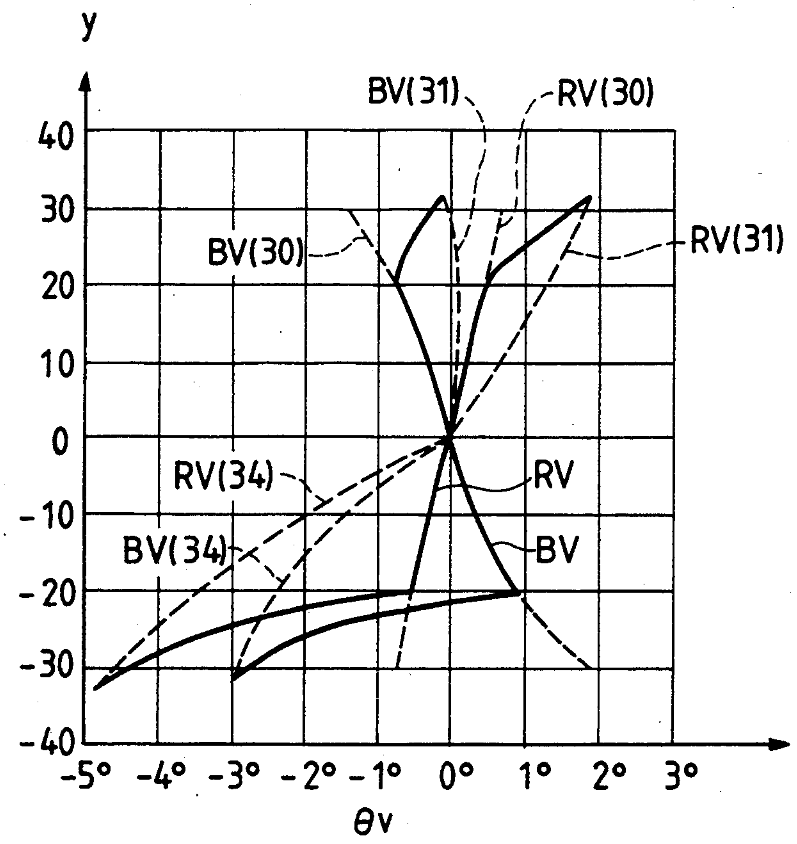
FIG. 6(*a*) is a graph for illustrating the chromatic aberrations that occur in a vertical section of the projection lens according to the first embodiment, and FIG. 6(*b*) is a graph for illustrating the spreading action that is exhibited in a horizontal section of the projection lens according to the first embodiment.
Figure 6B:
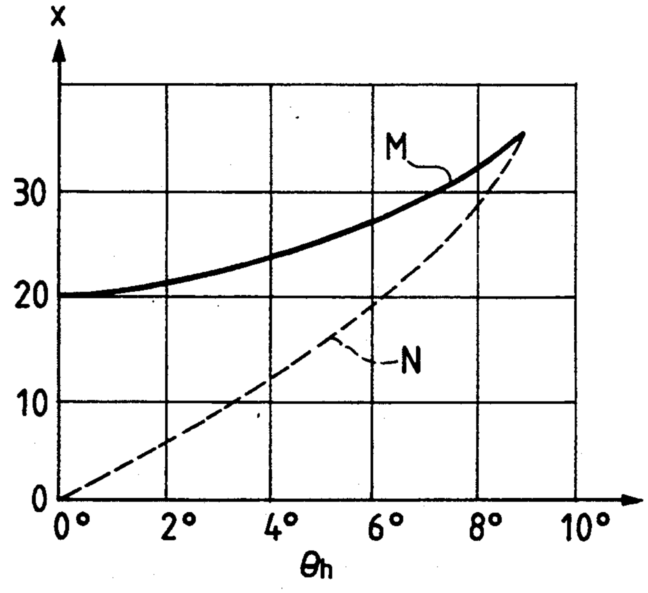

FIG. 6(*a*) shows graphically how chromatic aberrations are reduced in the first embodiment, taking as an exemplary case the relationship between the y coordinate, namely, the height of a section of the projection lens 8 as cut through the y-z plane, and the angle the direction of emerging rays corresponding to that height forms with respect to the optical axis (this angle is denoted by $\theta_v$, which is defined to be greater than zero ($\theta_v>0$) for upward light and smaller than zero ($\theta_v<0$) for downward light).

In this exemplary case, DY=20 mm and BF=30 mm, and $\Delta Bf_{y-z}$ is in the range from 1 to 4 mm, in other words, the focal length is varied over a certain range until the back focal length in the region B becomes 31 mm in the upper half of the lens and 34 mm in the lower half of the lens.

Curve BV(30) in FIG. 6(*a*) is a characteristic curve for ray tracing in the case where the lens system is constructed with the front end of the shield plate positioned at the focus of an aspheric lens having rotational symmetry with BF=30 mm (indicated by a one-long-and-one-short dashed line in FIGS. 2(*b*) and 3(*b*) for the sake of comparison with the embodiment under consideration), with a blue light source (486 nm) placed at the focus of the lens system. Curve RV(30) is a characteristic curve for ray tracing in the case where a red light source (656 nm) is placed at the focus of the same lens system.

Curve BV(31) is a characteristic curve for ray tracing in the case where a lens system is constructed with the front end of a shield plate positioned at focus F (BF=30 mm) with respect to an aspheric lens of rotational symmetry with BF=31 mm, with a blue light source (486 nm) placed at the focus of the lens system. Curve RV(31) is a characteristic curve for ray tracing in the case where a red light source (656 nm) is placed at the focus of the same lens system.

The projection lens 8 has a characteristic curve BV with respect to blue light as indicated by a solid line in FIG. 6, and it has a characteristic curve RV with respect to red light as also indicated by a solid line.

As shown, the characteristic curves BV and RV coincide with curves BV(30) and RV(30), respectively, on the lower side of the lens for the range $-20<y<0$; however, in the range $y<-20$, the slope of $\theta_v$ changes abruptly and BV and RV asymptotically approach the curves BV(34) and RV(34), respectively.

Thus, with decreasing distance to the lower edge of the lens, emerging rays are directed toward $\theta_v<0$, or bent downward by a sufficient degree to render the chromatic aberration less noticeable.

The upper side ($y>0$) of the characteristic curves BV and RV coincide with curves BV(30) and RV(30), respectively, in the range $20>y>0$; however, in the range $y>20$, the slope of $\theta_v$ changes and BY and RV asymptotically approach the curves BV(31) and RV(31), respectively. Thus, with decreasing distance to the upper edge of the lens, emerging rays are bent upward by a sufficient degree to render the chromatic aberration less noticeable.

It should be noted here that although upwardly directed blue light remains in the range $0>y>-20$, it mixes with the upwardly directed red light in the upper part of the lens to become hardly noticeable when seen from a remote point.

FIG. 6(*b*) shows graphically the horizontal spreading action of the projection lens 8, taking as an exemplary case the relationship between the x-coordinate of a section of the projection lens as cut through the x-z plane and the angle the direction of emerging rays at that coordinate forms with respect to the optical axis (this angle is denoted by $\theta_h$, which is defined to be positive in the direction of departure from the optical axis).

In this exemplary case, DX=20 mm and the background focal length in a vertical direction is set at 30 mm, with $\Delta Bf_{x-z}$ ranging up to 4 in a horizontal direction; in other words, the focal length is varied over a certain range until the back focal length becomes 34 mm.

Curve M indicated by a solid line in FIG. 6(*b*) is a characteristic curve for ray tracing in the case where a point source is placed at point F with BF=30 mm, and curve N indicated by a dashed line is a characteristic curve for the case where DX=0.

Since a horizontal section of the lens is symmetric with respect to the y-z plane, FIG. 6(*b*) only shows the characteristic curves for the side of x>0.

In the range 0<x<20 that corresponds to the region A, the emerging rays are parallel ($\theta_h=0$) to the optical axis, but after transition to the range x>20, curve M asymptotically approaches the curve N, and hence the emerging rays are kept away from the optical axis to spread widely in the horizontal direction.

Figure 5:
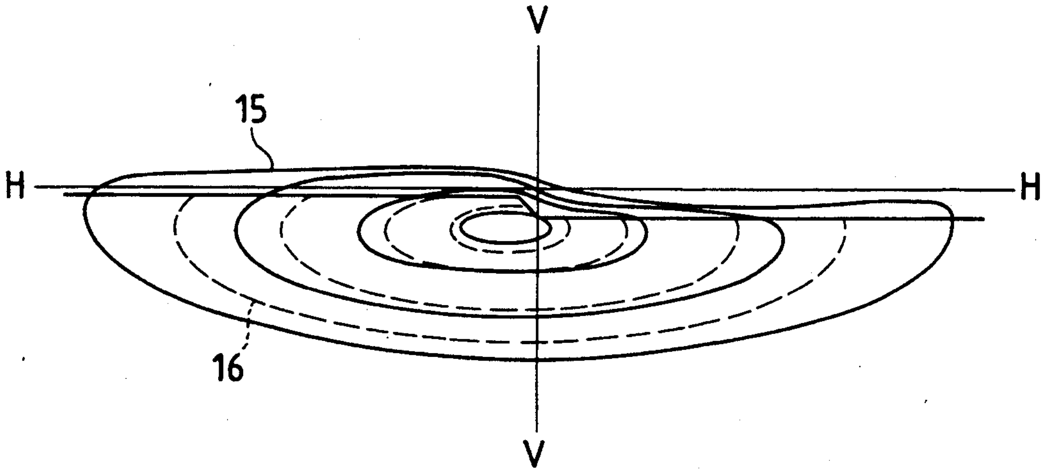
FIG. 5 is a diagram showing schematically the pattern of luminous intensity distribution according to the first embodiment as contrasted with the pattern of luminous intensity distribution according to an example of the prior art.

FIG. 5 compares two patterns of luminous intensity distribution and shows the difference diagrammatically, the first pattern being produced from the projection-type headlight 1 and the second pattern being produced from a conventional projection-type headlight in which the projection lines 8 is replaced with an aspheric lens having rotational symmetry. Pattern 15 indicated by a solid isocandela curve refers to the luminous intensity distribution pattern obtained in the embodiment under consideration, and pattern 16 indicated by a dashed isocandela curve refers to the luminous intensity distribution pattern obtained in the prior art. H-H denotes the horizontal axis and V-V denotes the vertical axis.

As already mentioned, in the embodiment under consideration $\Delta Bf_{y-z}$, or the amount of change in focal position, increases with decreasing distance to the margin of the projection lens 8 and, in particular, the focal length changes so greatly in the lower part of the lens that the closer the light is to the margin of the exit surface, the more divergent it is, thereby contributing to the reduction in the blue chromatic aberration that occurs in the neighborhood of the cut line.

This embodiment is further characterized in that the back focal length of the region B changes by a greater amount in the horizontal direction than in the vertical direction ($\Delta Bf_{x-z}>\Delta Bf_{y-z}$, and the pattern of luminous intensity distribution spreads through an increased angle in the horizontal direction.

The exit surface of the projection lens 8 can be determined by the following method. First, the amount of change in focal length is determined; then, the basic sectional shapes of the lens, namely, the shapes of sections as cut through the x-z and y-z planes are determined. Subsequently, the positions of points on the x- and y-axes at which the heights of various sections are the same in the y-direction are determined; the positions of points other than on these axes may be determined by defining the shape of the pertinent curved surface in terms of a contour line passing through two points on each axis (an ellipse is the general case for the shape of a curved line).

In the embodiment under discussion, the region A is assumed to be a circular region characterized by DY=DX=R, as seen from the front, but in the general case DY≠DX.

Figure 7A:
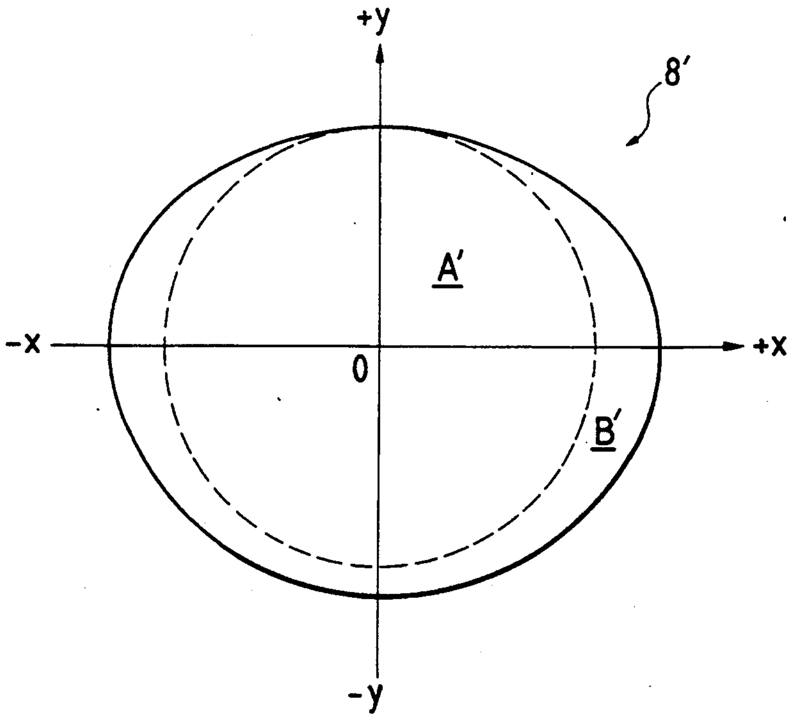
FIG. 7(*a*) is a front view showing a modification of the first embodiment, and FIG. 7(*b*) is an optical path diagram illustrating the focal length in a section as cut through the y-z plane.
Figure 7B:
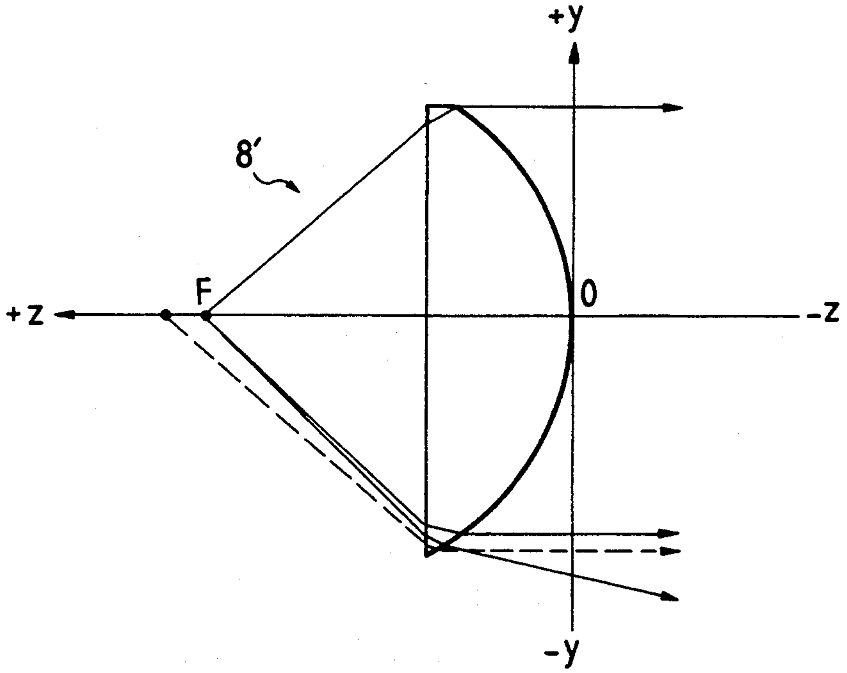

It should also be noted that although the embodiment described above relates to the case where the circular region A and the surrounding region B are arranged concentrically as seen from the front, the present invention is not limited thereto, and lens design may be performed to fabricate a projection lens 8' as shown in FIG. 7(*a*) where the upper edge of the contour of region A', as seen from the front, touches internally the upper edge of the contour of the surrounding region B'.

Stated more specifically, as shown in FIG. 7(*b*), which is a ray tracing diagram for a section of the projection lens 8' as cut through the meridional plane, the lens 8' is designed in such a way that, with respect to the region A', rays of light issued from the focus F and which pass through the lens are parallel to the optical axis, whereas in the region B', the back focal length increases progressively with decreasing distance to the marginal portion of the lens.

In the projection lens 8, the back focal length is designed to be constant in the meridional plane over the range DY; if desired, the back focal length may be made constant over the range on the upper side (y>0) of the meridional plane and over a predetermined range on the lower side (y<0), whereas in the range beyond that predetermined range closer to the lower edge of the lens, the back focal length may be adjusted to increase progressively with the decreasing distance to the edge of the lower end. Stated more specifically, the projection lens is such that when it is seen from the front, the back focal length is constant over the circular range and over the linear range where x=0 and y>0, whereas the back focal length increases in the other ranges with the decreasing distance to the marginal portion of the lens.

In the cases described above, the light that has passed through the range of the projection lens where the back focal length is constant makes an increased contribution to the luminous intensity at the center of the pattern of luminous intensity distribution, and hence not only is it ensured that the central luminous intensity necessary will meet the specifications of luminous intensity distribution, but at the same time an adequate amount of spreading light can be produced in a direction toward the shoulder of the roadway.

Next, a projection-type headlight 1A according to a second embodiment of the present invention will be described with reference to FIGS. 8(*a*) to FIG. 16.

It should be noted here that the projection lens 8A of the second embodiment differs from the projection lens 8 of the first embodiment in that the lens 8A has a shape produced by modifying the lens 8 to an extreme state, namely a linear form where DX=0 and the region A is limited to a section extending along the x-z plane.

The following description centers on the difference between the two projection lenses, and components that are not functionally different from those in the first embodiment are identified by the same numerals for the corresponding parts in the first embodiment and will not be described in further detail.

Figure 8A:
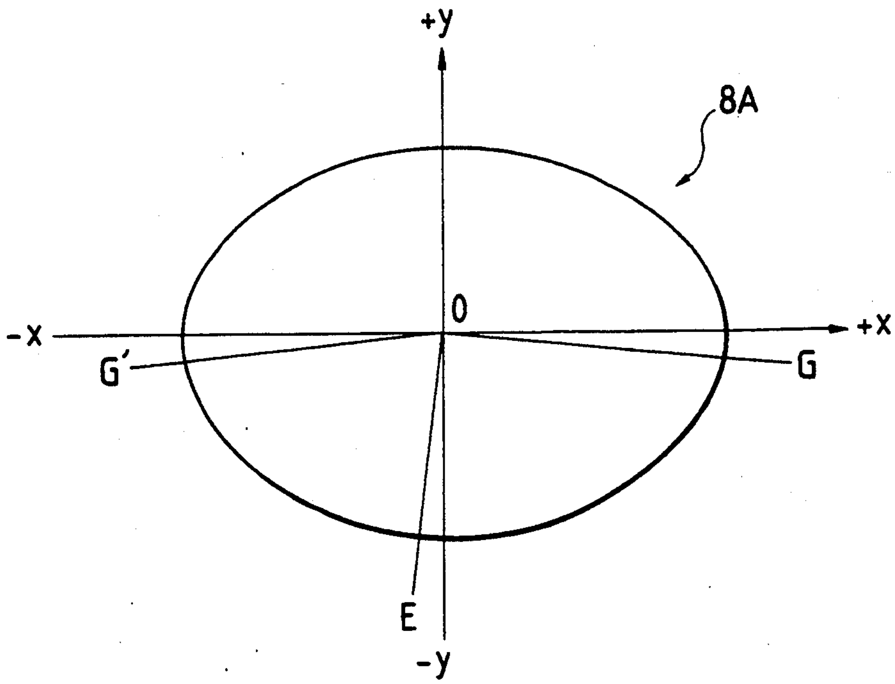
FIG. 8(*a*) is a front view showing a projection lens according to a second embodiment of the present invention, and FIG. 8(*b*) shows the projection lens as divided into a grid pattern of pixels as seen from the front.

FIG. 8(*a*) is a front view of the projection lens 8A as it is set on a rectangular coordinate system having three axes, the z-axis coincident with the optical axis L-L (the direction toward the light source is taken as "positive"), the x-axis that crosses the z-axis at right angles and which extends horizontally (the direction toward the right is taken as "positive"), and the y-axis that crosses the x-axis at right angles and which extends vertically (the upward direction is taken as "positive"), with the origin of these crossed axes coinciding with the vertex O of the projection lens 8A.

The external appearance of the projection lens 8A is not elliptical but the part on its upper side (y>0) with respect to the x-z plane is sightly flattened compared to the part on the lower side (y<0) with respect to the x-z plane. As shown in FIG. 8(*b*), the lens 8A is so designed that when its exit surface is divided into a grid pattern of small pixels as seen from the front, it has different focal lengths for the respective pixels.

Figure 9:
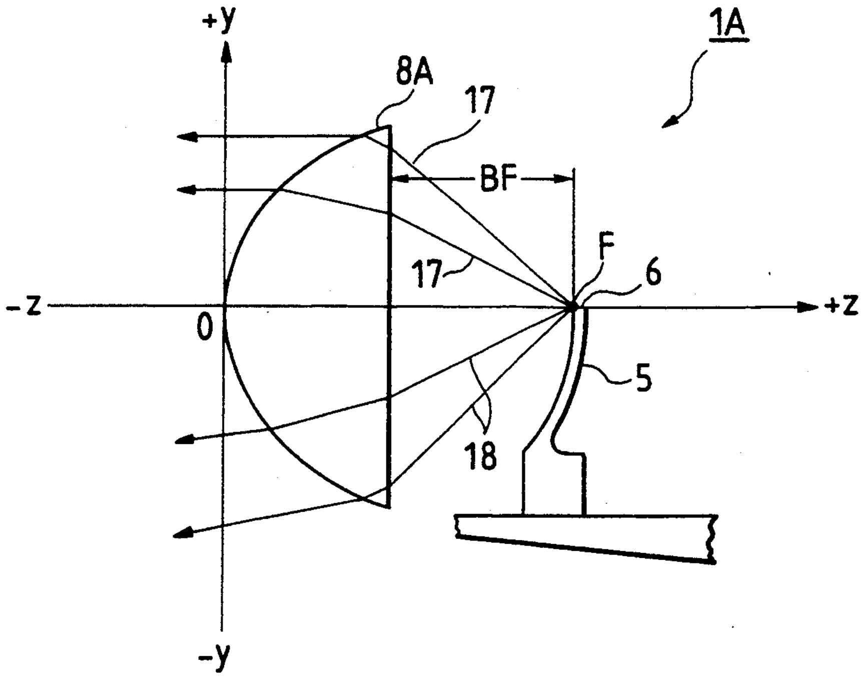
FIG. 9 is a diagram for illustrating the focal length in a section of the projection lens of FIGS. 8(*a*) and 8(*b*) as cut through the y-z plane.

FIG. 9 is a ray tracing diagram for a section of the front portion of the projection-type headlight 1A as cut through the y-z plane.

As shown by rays of light 17, the lens portion in the range $y \geqq 0$ has a constant focus F with a back focal length BF, and the focus F is positioned on the optical axis at the front end of the top edge of the shield plate 5.

As for the lens portion in the range $y<0$, the focal length increases with the increasing distance from the optical axis (i.e., with the decreasing distance to the margin) and the focus is shifted from point F progressively rearward, as indicated by rays of light 18.

Figure 10:
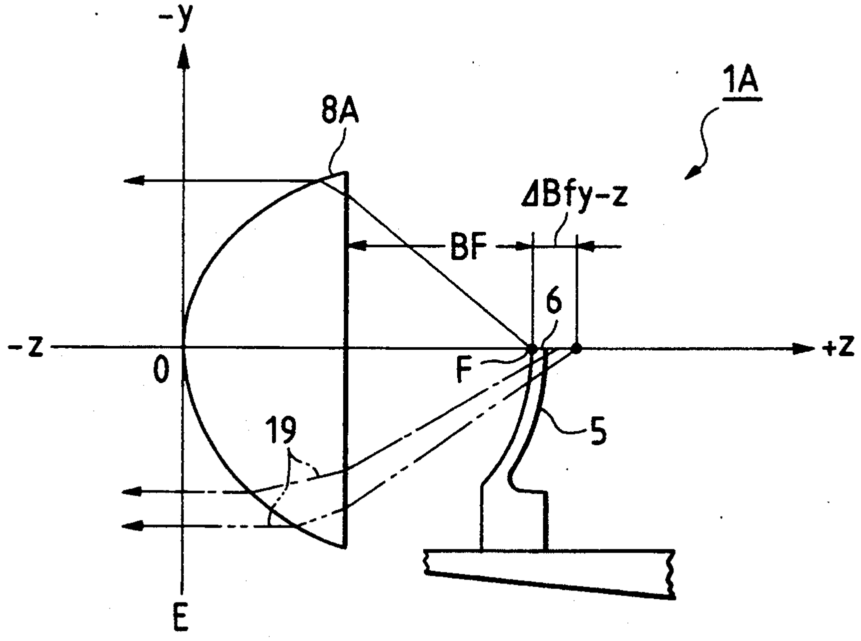
FIG. 10 is a ray tracing diagram illustrating the focal length in a section of the projection lens of FIGS. 8(*a*) and 8(*b*) as cut through the plane including the line +y-O-E and the z-axis.

FIG. 10 is a ray tracing diagram for a section of the front portion of the projection-type headlight 1A as cut through the plane including the positive part of y-axis, line OE and the z-axis (see FIG. 8(*a*)). In the region on the lower side ($y<0$), the focal position is shifted from point F progressively rearward with increasing distance from the vertex O as indicated by rays of light 19, and $\Delta Bf_{y\text{-}z}$, the amount of change in focal position, tends to increase with decreasing distance to the margin of the projection lens 8A.

Although not shown, the same tendency is observed in the region on the upper side ($y>0$) excepting the section cut through the y-z plane.

Figure 11:
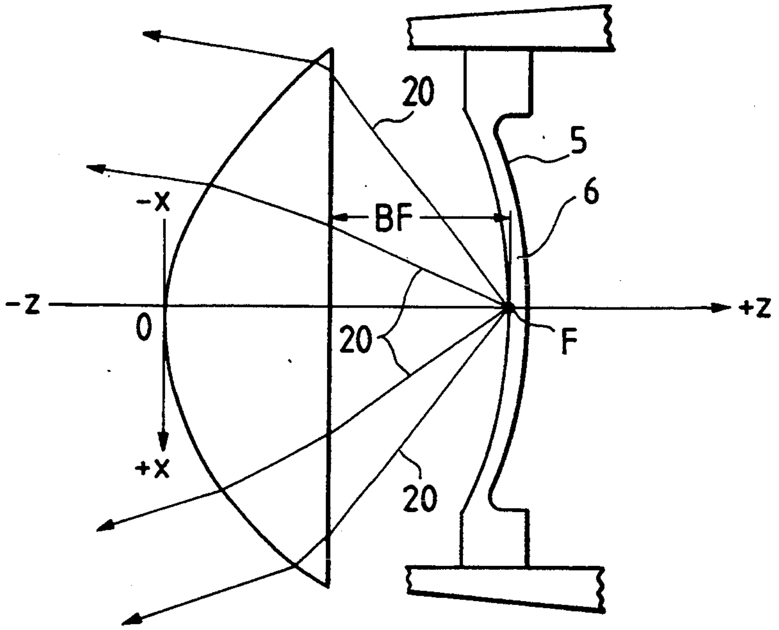
FIG. 11 is a ray tracing diagram illustrating the focal length in a section of the projection lens of FIGS. 8(*a*) and 8(*b*) as cut through the x-z plane.

FIG. 11 is a ray tracing diagram for a section of the front portion of the projection-type headlight 1A as cut through the x-z plane.

The lens has focus F with the back focal length BF only on the optical axis (i.e., $x=0$). As for the lens portion in the other ranges, namely, the range $x>0$ or $x<0$, the focal length increases with the increasing distance from the optical axis (i.e., with decreasing distance to the margin), and the focus is shifted from point F progressively rearward, as indicated by rays of light 20.

Figure 12:
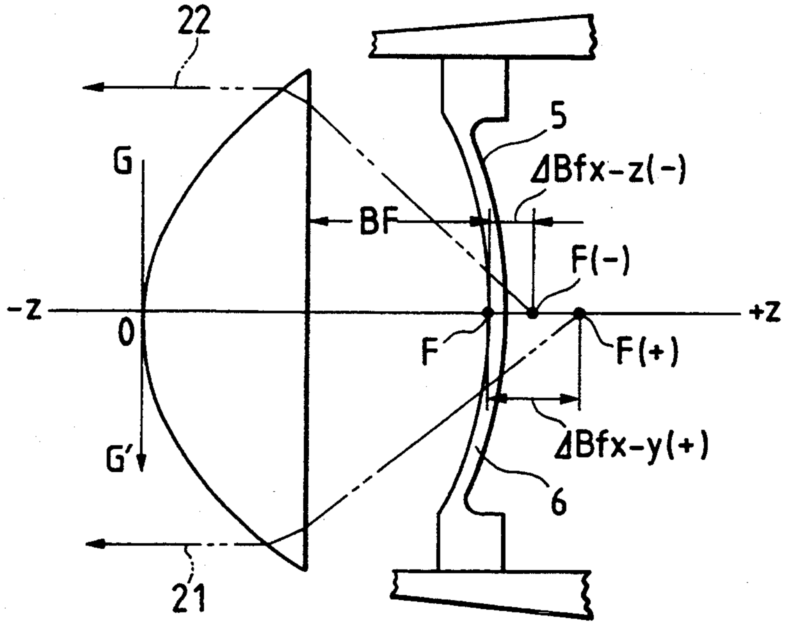
FIG. 12 is a ray tracing diagram for illustrating the focal length in a section of the projection lens of FIGS. 8(*a*) and 8(*b*) as cut through the plane including the line G-O-G′ and the z-axis.

FIG. 12 is a ray tracing diagram for a section of the front portion of the projection-type headlight 1A as cut through the plane including the line GO, line OG' and the z-axis (see FIG. 8(*a*)).

The focus is set on the optical axis in such a way that the focal position is shifted from point F progressively rearward with increasing distance from the vertex O.

It should, however, be noted that the amount of change in back focal length is specified so that $\Delta Bf_{x\text{-}z}(+)$, or the amount of change taking place in the range $x>0$ is greater than $\Delta Bf_{x\text{-}z}(-)$, or the amount of change in the range $x<0$, as indicated by rays of light 21 and 22.

In FIG. 12, two cases of the focus are denoted by F(+) and F(−).

Thus, the second embodiment is the same as the first embodiment in that the change in back focal length (especially the change that occurs on the lower side of the lens) increases with decreasing distance to the margin of the lens, whereby the closer the light is to the margin of the exit surface, the more divergent it is, thus contributing to the reduction in the blue chromatic aberration that occurs in the neighborhood of the cut line.

Although not shown, the aberrational curves for the projection lens 8A are such that when a vertical section of the lens is taken, the curves BV and RV shown in FIG. 6(*a*) hold true in the part on the lower side ($y<0$), whereas the aberrational curves coincide with curves BV(30) and RV(30) in the part on the upper side ($y>0$). In a horizontal section of the lens, the characteristic curve coincides with the curve N ($DX=0$) shown in FIG. 7.

Thus, in the second embodiment, the focal length as measured in the horizontal direction can be varied by a greater amount than in the first embodiment, and it is possible to produce a pattern of luminous intensity distribution having an even larger angle of spread in the horizontal direction.

The shape of the projection lens 8A is most commonly determined by the same method as described in connection with the first embodiment in which the lens shape is defined by contour lines viewed in a direction parallel to the optical axis. However, a different method may be adopted for attaining the same purpose. As shown in FIG. 8(*b*), the lens is divided into a grid pattern of pixels in the x-y plane and the shape and focal length are determined for each pixel. Two approaches of this method are discussed below.

(1) Algebraic approach

Figure 13:
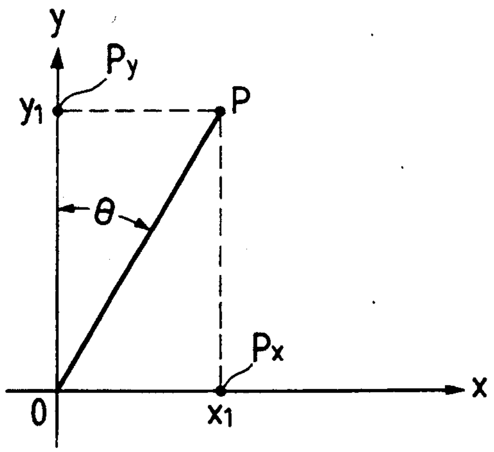
FIG. 13 is a graph showing the positional coordinates of point P in the y-x plane.

As shown in FIG. 13, let a point P on the x-y plane be assumed to have coordinates ($x_1$, $y_1$) and also assume that a segment OP connecting the origin O and the point P forms an angle of 0° with respect to the y-axis.

Let $P_x$ be the point at which the point P is projected onto the x-axis and $P_y$ be the point at which the same point P is projected onto the y-axis.

Given the basic geometry of the lens on both x- and y-axes, the value of the z coordinate for a desired point P can be determined on the basis of the given data by the following method.

Figure 14:
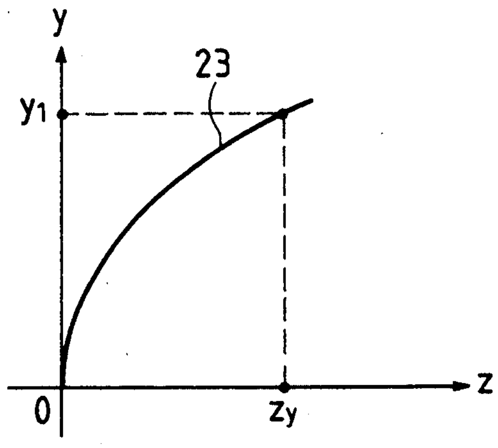
FIG. 14 is a graph showing an example of the lens curve in the y-z plane.

FIG. 14 shows a lens curve 23 for the exit surface in the y-z plane and the value of z coordinate corresponding to the coordinate $y_1$ of the projected point $P_y$ is zy.

Figure 15:
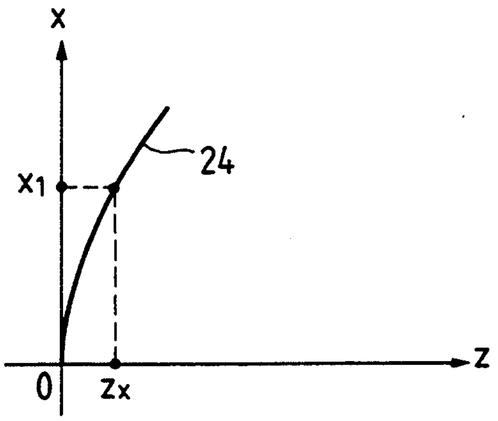
FIG. 15 is a graph showing an example of the lens curve in the x-z plane.

FIG. 15 shows a lens curve 24 for the exit surface in the x-z plane and the value of z coordinate corresponding to the coordinate $x_1$ of the projected point $P_x$ is zx.

Using these coordinate values zx and zy, the value of the z coordinate corresponding to the point P can be determined by the following equation:

$$z = zx \cdot |\sin\theta| + zy \cdot |\cos\theta|, \text{ or}$$

$$z = zx \cdot \sin^2\theta + zy \cdot \cos^2\theta$$

This method can be used to determine the z coordinate for any point of intersection of the lattices on the x-y plane.

(2) Approach using a focal length distribution table

Figure 8B:
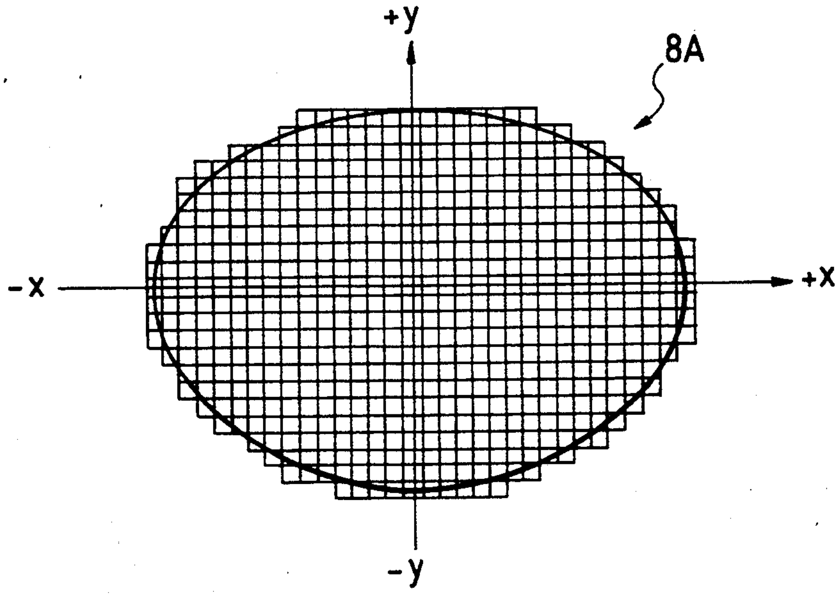
Figure 16:
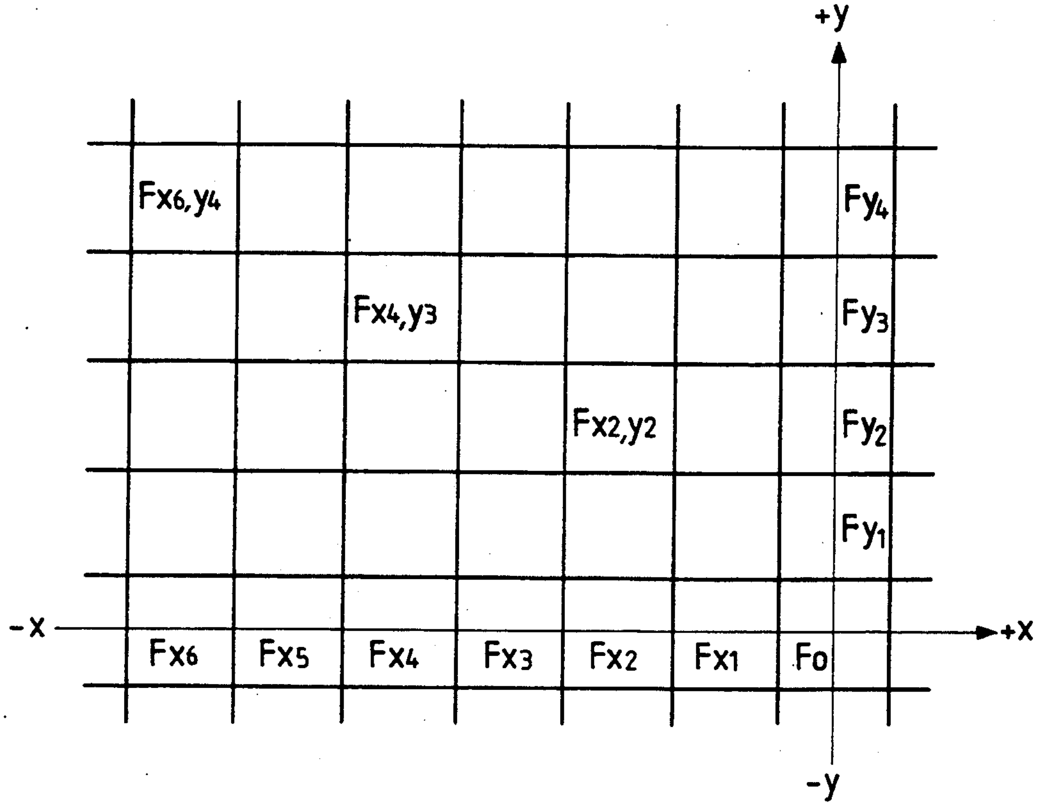
FIG. 16 is a diagram showing a distribution of focal lengths for various pixels.

FIG. 16 shows an enlarged region of the second quadrant of FIG. 8*b* which is close to the origin, with focal lengths being plotted for the respective pixels on the x-y plane divided into a grid pattern.

In the drawing, $F_{xi}$ and $F_{yi}$ (i is an integer) denote the focal lengths for pixel-specifying indices xi and yi, $F_{xi}$ denotes the focal length of a pixel lying on the x-axis, and $F_{yi}$ denotes the focal length of a pixel lying on the y-axis.

Symbol $F_O$ denotes the focal length of the pixel lying at the origin O.

In the simplest case, $F_{xi}$ and $F_{yi}$ are defined by the following equations:

$$F_{xi} = F_0 + \sum_{k=1}^{i} \Delta Bf_{xk}$$

-continued $$F_{yi} = F_0 + \sum_{k=1}^{i} \Delta Bf_{yk}$$

In these equations, $\Delta Bf_{xk}$ denotes the amount of change in back focal length for the pixel on the x-axis that is specified by the index xk, whereas $Bf_{yk}$ denotes the amount of change in back focal length for the pixel on the y-axis that is specified by the index yk.

In short, the shape of the lens as taken along the x- and y-axes is determined by those equations.

Next, let $F_{xi,yi}$ be written for the focal length in an area departing from the two axes, namely, a pixel specified by the set of indices xi and yi, which may be determined by the following equation using $F_{xi}$ and $F_{yi}$ calculated by the relevant equations:

$$F_{xi,yi} = F_{yi} + \sum_{k=1}^{i} \Delta Bf_{xk}$$

By applying these procedures of calculation to the entire part of the lens starting from the region near the x- and y-axes and progressively approaching the marginal portion of the lens, the distribution of focal lengths can be expressed by a matrix the elements of which are $F_{xi}$, $F_{yi}$ and $F_{xi,yi}$ with the result that the shape of the lens at issue is finally determined.

Figure 17:
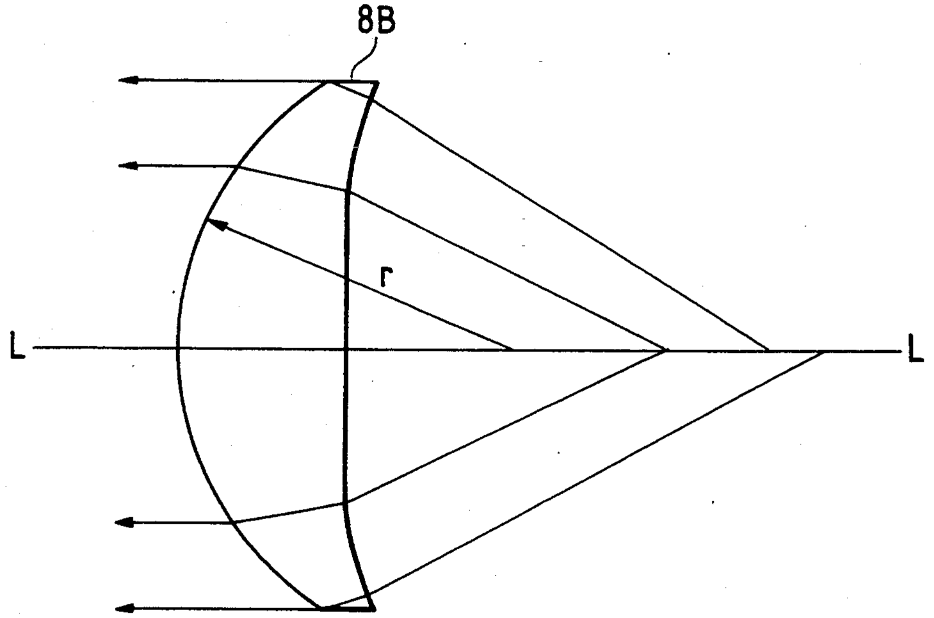
FIG. 17 is a diagram showing schematically a modified projection lens.
Figure 18:
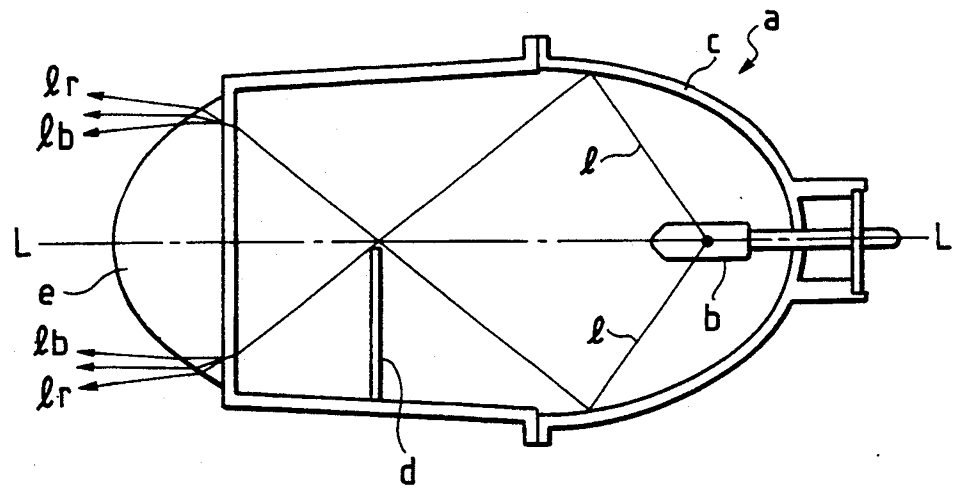
FIG. 18 PRIOR ART
FIG. 18 is a schematic cross section illustrating problems with a conventional projection-type headlight.
Figure 19:
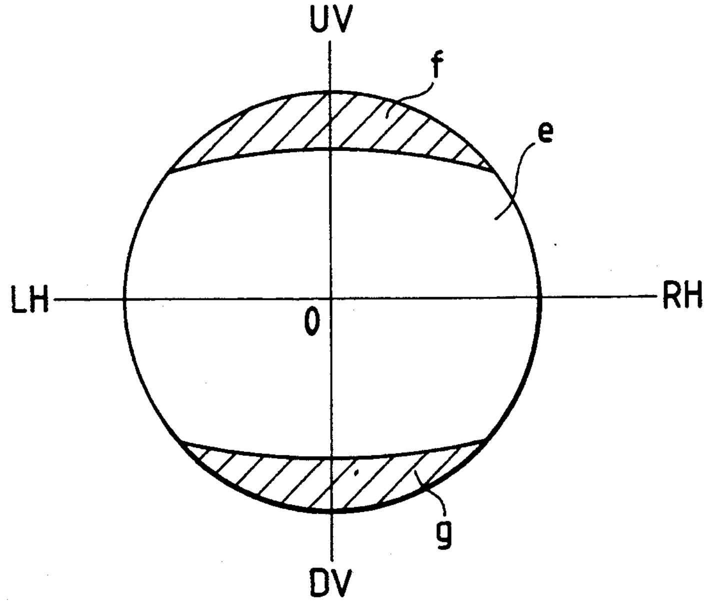
FIG. 19 PRIOR ART
FIG. 19 is a front view showing the projection lens in a conventional projection-type headlight.

The second embodiment under consideration as well as the first embodiment already discussed hereinabove assume the use of a convexoplane projection lens, but the present invention is not so limited, and, as exemplified by a projection lens 8B in FIG. 17, a meniscus lens having a spherical surface of radius r as the exit face may be used, with the entrance face having different focal lengths at different sites.

As will be clear from the foregoing description, the headlight of the present invention is so designed that the back focal length increases progressively with the decreasing distance to the margin of the lens except in the portion where the beams of outgoing light parallel to the optical axis are produced, so that the closer the point of in is to the upper or lower edge of the lens in a vertical section thereof, the farther away is the light controlled to emerge. As a result, the effect of chromatic aberrations on the pattern of luminous intensity distribution can be reduced.

In addition, the closer the point of incidence of light is to the margin of the lens in its horizontal direction, the farther away is the light controlled to emerge, which offers the advantage that a pattern of luminous intensity distribution that is adequately spread in the horizontal direction can be produced merely by improving the shape of the lens.

What is claimed is:

1. In a projection-type headlight comprising: a reflector having first and second focal positions, a light source, a projection lens, said light source being located at said first focal position of said reflector with light from said light source reflected by said reflector being gathered at said second focal position of said reflector, and a shield plate for limiting a cut line having a top edge lying near said second focal position, a patterned image of said shield plate being projected through said projection lens, said projection lens lying forward of said shield plate, the improvement wherein:

(1) foci of said projection lens in a section of at least one of an exit surface and an entrance surface of said projection lens as cut through at least one of said horizontal and a vertical plane lie on an optical axis of said projection lens;

(2) said foci of said projection lens defined for a first range of at least one of said exit surface and said entrance surface within a predetermined distance from said optical axis in both a horizontal and a vertical direction lie near a top edge of said shield plate; and (3) a second back focal length of said projection lens in a second range outside said first range is longer than a first back focal length in said first range and increases progressively with decreasing distance to a margin of said lens.

2. The projection-type heading according to claim 1, wherein a second back focal length of said projection lens in said section of said projection lens as cut through said vertical plane including said optical axis is greater in a portion lying below said horizontal plane including said optical axis than in a portion lying above said horizontal plane.

3. The projection-type headlight according to claim 1, wherein said second back focal length of said projection lens in said section of said projection lens as cut through said horizontal plane including said optical axis is longer than said second back focal length of said projection lens in said section of said projection lens as cut through said vertical plane including said optical axis.

4. The projection-type headlight according to claim 2, wherein said second back focal length of said projection lens in said section of said projection lens as cut through said horizontal plane including said optical axis is longer than said second back focal length of said projection lens in said section of said projection lens as cut through said vertical plane including said optical axis.

5. In a projection-type headlight comprising: a reflector having first and second focal positions, a light source, a projection lens, said light source being located at said first focal position of said reflector with light from said light source reflected by said reflector being gathered at said second focal position of said reflector, a shield plate for limiting a cut line having a top edge lying near said second focal position, a patterned image of said shield plate being projected through said projection lens, said projection lens lying forward of said shield plate, the improvement wherein:

(1) foci of said projection lens in a section of at least one of an exit surface and an entrance surface of said projection lens as cut through at least one of said horizontal and a vertical plane lie on an optical axis of said projection lens;

(2) said foci of said projection lens defined for a predetermined first range of said section of at least one of said exit surface and said entrance surface as cut through said vertical plane including said optical axis lie near a top edge of said shield plate; and (3) a second back focal length of said projection lens in a second range outside said first range is longer than a first back focal length in said first range and increases progressively with decreasing distance to a margin of said lens.

6. The projection-type heading according to claim 5, wherein said second back focal length of said projection lens in said section of said projection lens as cut through said vertical plane including said optical axis is greater in a portion lying below said horizontal plane including said optical axis than in a portion lying above said horizontal plane.

7. The projection-type headlight according to claim 5, herein said second back focal length of said projection lens in said section of said projection lens as cut through said horizontal plane including said optical axis is longer than said second back focal length of said projection lens in said section of said projection lens as cut through said vertical plane including said optical axis.

8. The projection-type headlight according to claim 6, wherein said second back focal length of said projection lens in said section of said projection lens as cut through said horizontal plane including said optical axis is longer than said second back focal length of said projection lens in said section of said projection lens as cut through said vertical plane including said optical axis.

* * * * *